United States Patent [19]

Allen

[11] 4,099,738
[45] Jul. 11, 1978

[54] BICYCLE ACCESSORY MEANS

[76] Inventor: Elbert F. Allen, 2685 Country Green Rd., Memphis, Tenn. 38134

[21] Appl. No.: 756,471

[22] Filed: Jan. 3, 1977

[51] Int. Cl.² .......................... B62J 5/20; A63H 5/00
[52] U.S. Cl. .............................. 280/289 D; 46/175 R
[58] Field of Search ......................... 280/289, 1.14; 180/33 D, 34; 296/21; 46/175 R, 204, 205; D12/114; 350/97, 99

[56] References Cited

U.S. PATENT DOCUMENTS

| 2,578,682 | 12/1951 | Fernstrom | 280/1.14 |
|---|---|---|---|
| 3,029,553 | 4/1962 | Clemens | 46/175 R |
| 3,266,455 | 8/1966 | Cohn | 46/175 R |
| 3,439,926 | 4/1969 | Bayard | 280/1.14 |
| 3,528,721 | 9/1970 | LaLonde | 350/99 |

FOREIGN PATENT DOCUMENTS

| 52,957 | 8/1942 | Netherlands | 280/289 |
|---|---|---|---|
| 112,609 of | 1918 | United Kingdom | 46/205 |

*Primary Examiner*—Joseph F. Peters, Jr.
*Assistant Examiner*—Donn McGiehan
*Attorney, Agent, or Firm*—John R. Walker, III

[57] ABSTRACT

An accessory for attachment to a frame of a bicycle or the like of the type having at least one wheel rotatably mounted on the frame. The accessory includes a cylindrical roller for frictionally engaging the wheel of the bicycle to rotate therewith. At least one attraction-getting member is fixedly attached to the roller for rotation therewith. A connector including a substantially rigid body member is provided to fixedly attach the roller to the frame of the bicycle. The body member includes a first end for attachment to the frame of the bicycle and includes a second end for attachment to the roller. At least one spring is provided for forcing the roller against the wheel of the bicycle to cause the roller to frictionally engage the wheel of the bicycle so that the roller, and, therefore, the attraction-getting member, will rotate when the wheel of the bicycle rotates.

5 Claims, 4 Drawing Figures

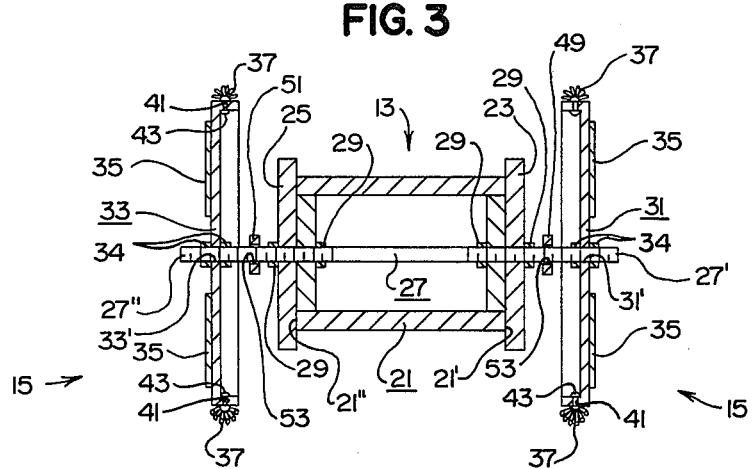
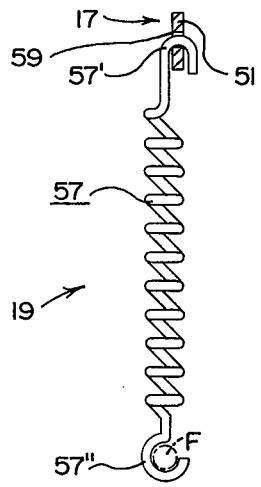

BICYCLE ACCESSORY MEANS

BACKGROUND OF THE INVENTION

1. Field of the Invention:

This invention relates generally to accessory means for bicycles and the like and more specifically to attention-getting means for rotating with the wheels of a bicycle or the like.

2. Description of the Prior Art:

Various accessories have heretofore been developed for attachment to bicyles and the like. Fernstrom, U.S. Pat. No. 2,578,682 discloses a hobbyhorse attachment for bicycles and the like which includes a simulated horse's head for mounting adjacent the handlebars of the bicycle or the like and which includes a roller means for engaging a wheel of the bicycle and the like for causing the simulated horse's heat to rock forwardly and rearwardly and for providing a hoofbeat-like sound when the wheel of the bicycle rotates. Schwartz et al, U.S. Pat. No. 3,099,243 discloses a moving signal accessory for bicycles which includes an elongated bar member mounted to one of the pedals of the bicycle and to the rear axle of the bicycle in a manner so that when the bicycle is pedaled, the bar member reciprocates and pivots causing a signal device mounted on a post that is attached to the rearward end of the bar member to move in an elliptical path. Bayard, U.S. Pat. No. 3,439,926 discloses a simulated motor device for attachment to a bicycle or the like which includes an energy-storing momentum wheel of heavy cast iron for gripping the wheel of the bicycle and for rotating therewith to aid in the propelling of the bicycle or the like and to give some sensation of a motor drive to the bicycle or the like. None of the above patents disclose, teach or suggest the present invention.

SUMMARY OF THE INVENTION

The present invention is directed towards providing an attention-getting accessory for a bicycle or the like which increases the safety of the user of the bicycle or the like and which otherwise increases the enjoyment and amusement qualities of the bicycle or the like. The concept of the present invention is to provide a bicycle or the like with one or more attention-getting members which rotate with the wheels of the bicycle or the like to thereby increase the safety of the bicycle or the like by making the bicycle or the like more visible and to thereby increase the enjoyment and amusement qualities of the bicycle or the like because of the novelty of the assessory, etc.

The accessory means of the present invention includes, in general, roller means for rotation with the wheel of the bicycle; attraction-getting means including at least one attraction-getting member for being fixedly attached to the roller means for rotation therewith; connector means for attaching the roller means to the frame of the bicycle, the connector means including a substantially rigid body member having a first end for attachment to the frame of the bicycle and having a second end of attachment to the roller means; and spring means for forcing the roller means against the wheel of the bicycle to cause the roller means to frictionally engage the wheel of the bicycle so that the roller means will rotate when the wheel of the bicycle rotates.

BRIEF DESCRIPTION OF THE DRAWINGS

FIG. 3 is a sectional view of a portion of the accessory means of the present invention as taken on line III—III of FIG. 1.

FIG. 4 is a sectional view of a portion of the accessory means of the present invention as taken on line IV—IV of FIG. 2.

DESCRIPTION OF THE PREFERRED EMBODIMENT

Figure 1:
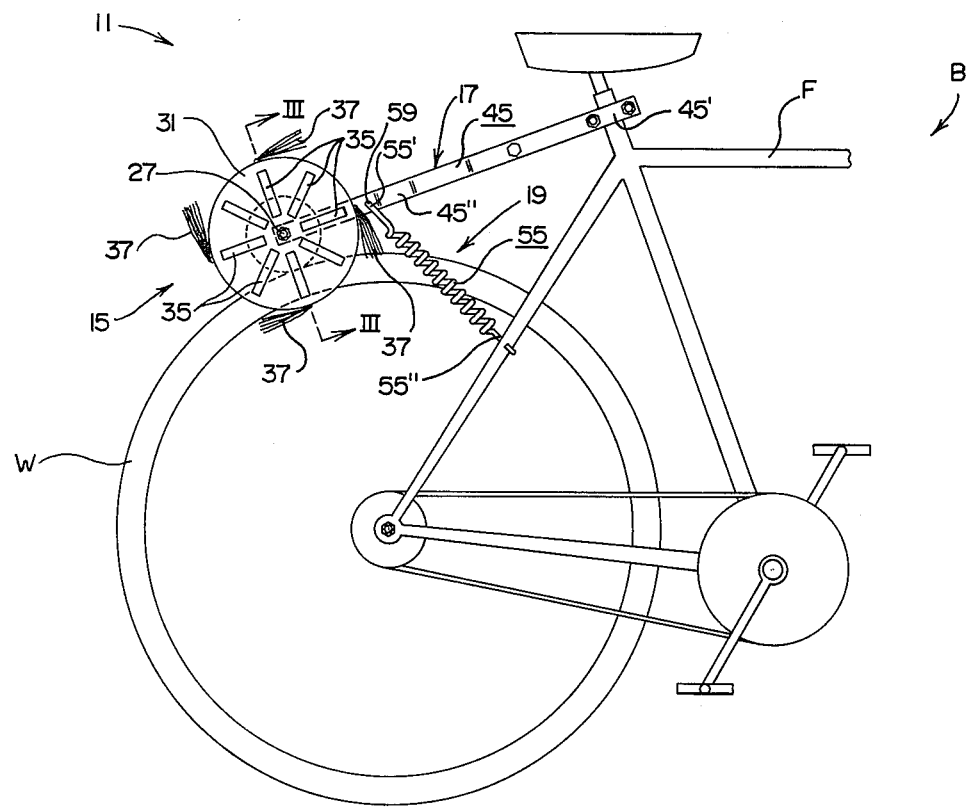
FIG. 1 is side elevational view of the accessory means of the present invention shown attached to a bicycle.

The accessory means 11 of the present invention is for attachment to a bicycle B or the like of the type having a frame F and at least one wheel W rotatably mounted to the frame F thereof (see FIG. 1). In general, the accessory means 11 of the present invention includes roller means 13 for rotation with the wheel W of the bicycle B; attention or attraction-getting means 15 for rotation with the roller means 13; connector means 17 for attaching the roller means 13 to the frame F of the bicycle B; and spring means 19 for forcing the roller means 13 against the wheel W of the bicycle B to cause the roller means 13 to frictionally engage the wheel W of the bicycle B so that the roller means 13 will rotate when the wheel W of the bicycle B rotates.

Figure 2:
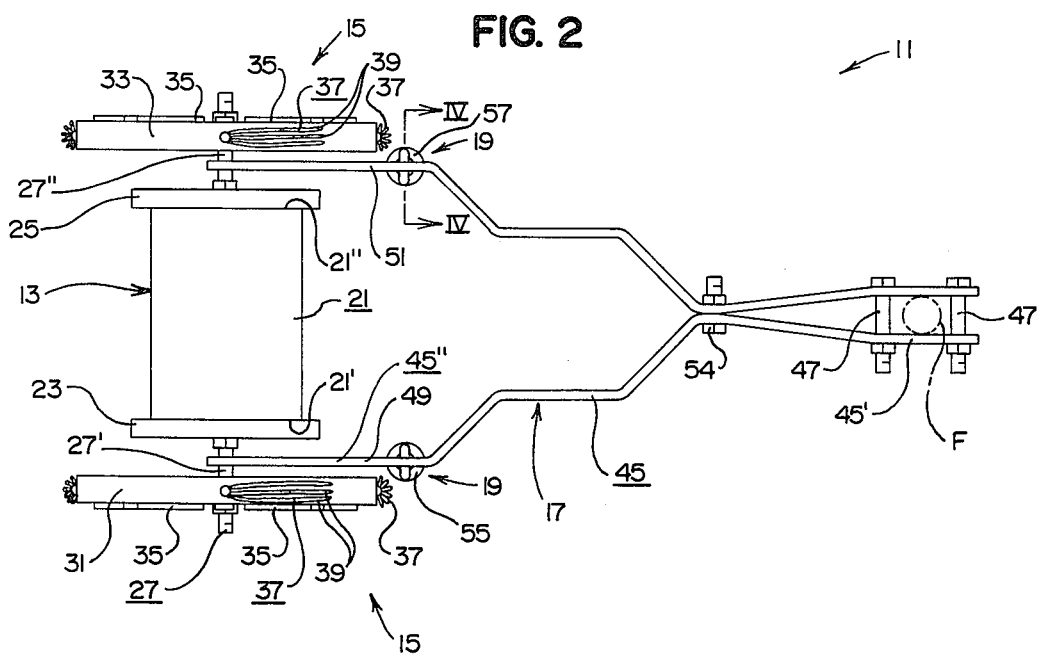
FIG. 2 is a top plan view of the accessory means of the present invention.

The roller means 13 of the accessory means 11 preferably includes a cylindrical body member 21 having a first end 21' and a second end 21''. The cylindrical body member 21 may be hollow and may be provided with first and second platelike end portions 23, 25, respectively, fixedly attached to the first and second ends 21', 21'' thereof as shown in FIGS. 2 and 3. The roller means 13 also preferably includes an axle member 27 attached to and extending through the cylindrical body member 21 substantially along the longitudinal axis thereof as shown in FIG. 3 for rotation therewith. The axle member 27 preferably includes a first portion 27' extending outwardly of the first end portion 23 of the cylindrical body member 21 and preferably includes a second portion 27'' extending outwardly of the second end portion 25 of the cylindrical body member 21 as shown in FIGS. 2 and 3. At least the end portions of the axle member 27 are preferably threaded and the first and second end portions 23, 25 of the cylindrical body member 21 may be fixedly attached to the cylindrical body member 21 by way of nut members 29 which also serve to fixedly attach the cylindrical body member 21 to the axle member 27 as clearly shown in FIG. 3, so that the axle member 27 will rotate with the cylindrical body member 21 when the cylindrical body member 21 rotates.

The attraction-getting means 15 includes at least one attraction-getting member for being fixedly attached to the roller means 13 for rotation therewith. Preferably, the attraction-getting means includes a first attraction-getting platelike member 31 for fixed attachment to the first portion 27' of the axle member 27 for rotation therewith and preferably includes a second attraction-getting platelike member 33 for fixed attachment to the second portion 27'' of the axle member 27 for rotation therewith (see FIGS. 2 and 3). Each platelike member 31, 33 may be constructed of plastic or the like and may consist of a well-known toy-type device such as sold under the Trade Mark "Frisbee" by The Wham-O Manufacturing Company, adapted to be fixedly attached to the axle member 27 in any manner apparent to those skilled in the art. For example, each platelike member 31, 33 may have an aperture 31', 33' for allowing the ends of the axle member 27 to pass therethrough and may be fixedly attached to the axle member 27 by way of nut members 34 as shown in FIG. 3. The attraction-getting means 15 may include reflective means 35 fixedly attached to each of the first and second attention-getting platelike members 31, 33 for rotation therewith (see FIGS. 1, 2 and 3). The reflective means 35 may consist simply of one or more strips of well-known reflective tape or the like fixedly attached to the first and second attraction-getting platelike members 31, 33. The attention-getting means 15 may also include a plurality of streamer means 37 fixedly attached to each of the first and second attraction-getting platelike members 31, 33 as shown in FIGS 1, 2 and 3 for rotation therewith. Each streamer means 37 may consist of a plurality of lengths of ribbonlike material 39 (see, in general, FIG. 2) fixedly attached to one of the first and second attraction-getting platelike members 31, 33 in any manner apparent to those skilled in the art such as by being clipped to an aperture 41 along the outer periphery of one of the first and second attraction-getting platelike members 31, 33 by way of spring clip-like member 43 or the like (see in general FIG. 3 ).

The connector means 17 of the accessory means 11 includes a substantially rigid body member 45 having a first end 45' for attachment to the frame F of the bicycle B and having a second end 45" for attachment to the roller means 13. The first end 45' of the body member 45 is preferably substantially U-shaped for receiving a portion of the frame F of the bicycle B therein (see FIG. 2). The connector means 17 preferably includes means for selectively clamping the first substantially U-shaped end 45' of the body member 45 about a portion of the frame F of the bicycle B to fixedly attach the body member 45 thereto. The means may consist simply of one or more bolt members 47 extending through the first substantially U-shaped end 45' of the body member 45 as shown in FIG. 2 to pull the opposite legs of the U-shaped end 45' together when the bolt members 47 are tightened as will be apparent to those skilled in the art. The second end 45" of the body member 45 is also preferably substantially U-shaped for receiving the roller means 13 therein as clearly shown in FIG. 2. The second substantially U-shaped end 45" includes first and second spaced apart leg portions 49, 51. Each of the first and second leg portions 49, 51 preferably includes an aperature 53 (see FIG. 3) for allowing the first and second portions 27', 27", respectively, of the axle member 27 to pass therethrough as shown in FIG. 3. The apertures 53 are preferably of a size larger than the diameter of the axle member 27 for allowing the axle member 27 and, therefore, the roller means 13 to rotate therein. The body member 45 is preferably constructed of metal and may be shown in FIG. 2 with the two halves bolted together by a bolt member 54.

The spring means 19 preferably includes a first spring member 55 having a first end 55' fixedly attached to the first leg portion 49 of the second substantially U-shaped end 45" of the body member 45 and having a second end 55" for being fixedly attached to the frame F of the bicycle B (see FIG. 1). The spring means 19 also preferably includes a second spring member 57 having a first end 57' fixedly attached to the second leg portion 51 of the second substantially U-shaped end 45" of the body member 45 and having a second end 57" for being fixedly attached to the frame F of the bicycle B (see FIG. 4). It should be noted that the first and second leg portions 49, 51 of the second substantially U-shaped end 45" of the body member 45 may be provided with apertures 59 for receiving the first end 55', 57' of the first and second spring members 55, 57 as shown in FIGS. 1 and 4.

The preferred manner of using the accessory means 11 of the present invention is quite simple. To attach the accessory means 11 to a bicycle B, the first step is to attach the first end 45' of the body member 45 to the frame F of the bicycle B in a manner so that the roller means 13 contacts the wheel W of the bicycle B. Next, the second ends 55", 57" of the first and second spring members 55, 57 are attached to the frame F of the bicycle B in such a manner so as to pull the cylindrical body member 21 of the roller means 13 tightly against the wheel W of the bicycle B to cause the cylindrical body member 21 to frictionally engage the wheel W so that the cylindrical body member 21 and, therefore, the roller means 13 and attraction-getting means 15 will rotate when the wheel W of the bicycle B rotates. Then, when the wheel W of the bicycle B rotates, the attraction-getting means 15 of the accessory means 11 will rotate to make the bicycle B more visible and to increase the enjoyment and amusement created by riding the bicycle B because of the novelty of the accessory means 11.

Although the invention has been described and illustrated with respect to a preferred embodiment thereof, it is not to be so limited since changes and modifications may be made therein which are within the full intended scope of the invention.

I claim:

1. Accessory means for attachment to a bicycle or the like of the type including a frame and at least one rotatable wheel mounted on the frame, said accessory means comprising:
   (a) roller means for rotation with the wheel of the bicycle, said roller means having first and second ends;
   (b) attraction-getting means including first and second attraction-getting platelike members for being fixedly attached to said respective first and second ends of said roller means for rotation therewith, said first and second attraction-getting platelike members each having a predominant face surface directed outwardly of said roller means, said attraction-getting means including a plurality of reflective members attached to said face surfaces of each of said first and second attraction-getting platelike members;
   (c) connector means for attaching said roller means to the frame of the bicycle, said connector means including a substantially rigid body member having a first end for attachment to the frame of the bicycle and having a second end for attachment to said roller means; and
   (d) spring means for forcing said roller means against the wheel of the bicycle to cause said roller means to frictionally engage the wheel of the bicycle so that said roller means will rotate when the wheel of the bicycle rotates; said first end of said body member of said connector means being substantially U-shaped for receiving a portion of the frame of the bicycle therein, said connector means including means for selectively clamping said first substantially U-shaped end about a portion of the frame of the bicycle to fixedly attach said body member thereto, said second end of said body member of said connector means being substantially U-shaped for receiving said roller means therein, in which said second substantially U-shaped end includes first and second spaced apart leg portions, and said first end of said roller means being rotatably mounted to said first leg portion of said second substantially U-shaped end of said body member and said second end of said roller means being rotatably mounted to said second leg portion of said second substantially U-shaped end of said body member.

2. The accessory means of claim 1 in which said spring means includes a first spring member having a first end fixedly attached to said first leg portion of said second substantially U-shaped end of said body member and having a second end for being fixedly attached to the frame of the bicycle, and in which said spring means includes a second spring member having a first end fixedly attached to said second leg portion of said second substantially U-shaped end of said body member and having a second end for being fixedly attached to the frame of the bicycle.

3. Accessory means for attachment to a bicycle of the type including a frame and at least one rotatable wheel mounted on the frame, said accessory means comprising:
   (a) roller means for rotation with the wheel of the bicycle, said roller means including a cylindrical body member for engagement with the wheel of the bicycle, said cylindrical body member including first and second end portions, said roller means including an axle member attached to and extending through said cylindrical body member along the longitudinal axis thereof for rotation therewith, said axle member including a first portion extending outwardly of said first end portion of said cylindrical body member and including a second portion extending outwardly of said second end portion of said cylindrical body member;
   (b) attraction-getting means including a first attraction-getting platelike member for fixed attachment to said first portion of said axle member of said roller means for rotation therewith and including second attraction-getting platelike member for fixed attachment to said second portion of said axle member for rotation therewith, said first and second attraction-getting means each having a predominent face surface directed outwardly of said roller means, said attraction-getting means including a plurality of reflective members fixedly attached to said face surfaces of each of said first and second attraction-getting platelike members for rotation therewith, said attraction-getting means including a plurality of streamer means fixedly attached to each end of said first and second platelike members for rotation therewith;
   (c) connector means for fixedly attaching said roller means to the frame of the bicycle, said connector means including an elongated, substantially rigid body member for extending between said roller means and the frame of the bicycle, said body member including a first substantially U-shaped end for receiving a portion of the frame of the bicycle therein, said connector means including means for selectively clamping said first substantially U-shaped end about a portion of the frame of the bicycle to fixedly attach said connector means thereto, said body member means including a second substantially U-shaped end for receiving said roller means therein, said second substantially U-shaped end including first and second spaced apart leg portions, said first portion of said axle member being rotatably mounted to said first leg portion of said second substantially U-shaped end of said body member, said second portion of said axle member being rotatably mounted to said second leg portion of said second substantially U-shaped end of said body member; and
   (d) spring means for pulling cylindrical body member of said roller means against the wheel of the bicycle to cause said cylindrical body member to frictionally engage the wheel of the bicycle so that said roller means will rotate when the wheel of the bicycle rotates, said spring means including a first spring member having a first end fixedly attached to saif first leg portion of said second substantially U-shaped end of said body member of said connector means and having a second end for being fixedly attached to the frame of the bicycle in a manner so as to pull said cylindrical body member of said roller means against the wheel of the bicycle, said spring means including a second spring member having a first end fixedly attached to said second leg portion of said second substantially U-shaped end of said body member of said connector means and having a second end for being fixedly attached to the frame of the bicycle in a manner so as to pull said cylindrical body member of said roller means against the wheel of the bicycle.

4. The combination with a bicycle of the type including a frame and at least one wheel rotatably mounted on the frame, of accessory means for attachment to the frame of the bicycle, said accessory means comprising:
   (a) roller means for rotation with the wheel of the bicycle, said roller means including a cylindrical body member for engagement with the wheel of the bicycle, said cylindrical body member including first and second end portions;
   (b) attraction-getting means including a first attraction-getting platelike member fixedly attached to said first end portion of said cylindrical body member for rotation therewith and including a second attraction-getting platelike member fixedly attached to said second end portion of said cylindrical body member for rotation therewith, said first and second attraction-getting plate-like members each having a predominent face surface directed outwardly of said roller means, said attraction-getting means including a plurality of reflective members attached to said face surfaces of each of said first and second attraction-getting platelike members;
   (c) connector means fixedly attaching said roller means to the frame of the bicycle, said connector means including a substantially rigid body member having a first end fixedly attached to the frame of the bicycle and having a second end attached to said roller means; and
   (d) spring means forcing said roller means against the wheel of the bicycle to cause said roller means to frictionally engage the wheel of the bicycle so that said roller means will rotate when the wheel of the bicycle rotates, said spring means including at least a first spring member having a first end fixedly attached to said body member of said connector means and having a second end fixedly attached to the frame of the bicycle in a manner so as to pull said cylindrical body member of said roller means against the wheel of the bicycle.

5. The combination of claim 4 in which said attraction-getting means includes a plurality of streamer means fixedly attached to each of said first and second attraction-getting platelike members for rotation therewith.

* * * * *